Patented Nov. 14, 1939

2,179,836

UNITED STATES PATENT OFFICE 2,179,836

HARD FACING ALLOY

Allen E. Wisler and Henry B. Woods, Houston, Tex., assignors to Hughes Tool Company, Houston, Tex., a corporation of Delaware No Drawing. Application September 27, 1937, Serial No. 165,894

2 Claims. (Cl. 75—136)

Our invention relates to hard facing metals such as are employed in forming an abrasion resisting surfacing on cutting tools such as well drills, shovels and the like.

A surfacing material for this purpose must be extremely hard and also be tough enough to resist fracture in use. Tungsten carbide is frequently used for this purpose but this material has certain objections.

It is an object to provide a diamond substitute or hard facing material which will not only approach the hardness of diamond but be tough and resistant to fracture.

We desire to alloy well known hard substances such as molybdenum and boron with other ingredients in such proportion as to form a substance of the character desired.

Alloys of molybdenum and boron are very hard, but entirely too brittle to be useful as a hard facing material. We find, however, that when alloyed with certain other elements, a material admirably suited for this purpose is produced. The principal constituent of the alloy is molybdenum which is employed to the extent of from 60% to 95% of the alloy. Boron is used in the proportion of from 2% to 15% of the product. With these two elements we add from 3% to 20% of one or more of the group including iron, vanadium, chromium, tungsten, tantalum, manganese, nickel and cobalt. In fusing these elements in a carbon arc or resistance furnace, a small proportion of carbon is absorbed which may be as high as 5%.

In forming the alloy, the substances are placed together in the crucible of an electric arc or resistance furnace and brought to the temperature necessary to fuse the elements or the process may be performed by reducing the oxides of the elements with aluminum or magnesium.

The resulting product is not as hard as tungsten carbide, but is very tough and does not chip and break as readily as tungsten carbide. It is therefore better adapted for some forms of hard facing than is tungsten carbide.

As an example of one alloy which we find produces particularly good physical properties the following is noted:

| | Per cent |
|---|---|
| Molybdenum | 87 |
| Boron | 4 |
| Chromium | 6 |
| Carbon | 3 |

Another formula may be:

| | Per cent |
|---|---|
| Molybdenum | 60–95 |
| Boron | 2–15 |
| Carbon | 0– 5 |
| And one or more metals from the group iron, tantalum, vanadium, chromium, tungsten, manganese, nickel and cobalt | 3–10 |

Various modifications in the proportions of the materials used may be made without materially changing the qualities of the resulting alloy.

What we claim as new is:

1. An alloy of elements fused together approximately as follows:

| | Per cent |
|---|---|
| Molybdenum | 87 |
| Boron | 4 |
| Chromium | 6 |
| Carbon | 3 |

2. An alloy composed of elements fused together in the following proportions:

| | Per cent |
|---|---|
| Molybdenum | 60 to 95 |
| Boron | 2 to 15 |
| Carbon | 1 to 5 |
| Chromium | 3 to 10 |

ALLEN E. WISLER.
HENRY B. WOODS.